US012663534B2

(12) United States Patent
    Jayakumar et al.

(10) Patent No.: US 12,663,534 B2
(45) Date of Patent: Jun. 23, 2026

(54) MULTI-BEAM RADAR BASED GROUND SPEED SENSOR UTILIZING A SINGLE RADAR INTEGRATED CIRCUIT

(71) Applicant: HONEYWELL INTERNATIONAL INC., Charlotte, NC (US)

(72) Inventors: Prince Ashwin Kumar Anburaj Jayakumar, Charlotte, NC (US); Christopher Willis, Charlotte, NC (US); Sudhakar Arockiaraj, Charlotte, NC (US); Vikram Vasantha Bhat, Charlotte, NC (US); Shridhara Shanbhogue, Charlotte, NC (US); Bhagyshree Patil, Charlotte, NC (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 305 days.

(21) Appl. No.: 18/362,564

(22) Filed: Jul. 31, 2023

(65) Prior Publication Data

US 2024/0045051 A1 Feb. 8, 2024

(30) Foreign Application Priority Data

Aug. 4, 2022 (IN) .............................. 202211044678

(51) Int. Cl.
    *G01S 13/60* (2006.01)
    *G01S 7/41* (2006.01)
(52) U.S. Cl.
    CPC ................ *G01S 13/60* (2013.01); *G01S 7/41* (2013.01)
(58) Field of Classification Search
    CPC .................................. G01S 13/60; G01S 7/41
    See application file for complete search history.

(56) References Cited

U.S. PATENT DOCUMENTS

| | | | | |
|---|---|---|---|---|
| 5,204,682 A | * | 4/1993 | Beasley | ................. G01S 13/60 |
| | | | | 342/117 |
| 2005/0231436 A1 | * | 10/2005 | McLean | ............. H01Q 13/0275 |
| | | | | 343/786 |

(Continued)

OTHER PUBLICATIONS

Parker, True Ground Speed Sensors—TGSS, https://ph.parker.com/ca/en/product-list/tgss-true-ground-speed-sensors, Parker Hannifin Corp. 2023.

(Continued)

*Primary Examiner* — William Kelleher
*Assistant Examiner* — Hailey R Le
(74) *Attorney, Agent, or Firm* — Alston & Bird LLP

(57) ABSTRACT

An example multi-beam, radar based ground speed sensor utilizing a single radar integrated circuit apparatus, is provided. An example multi-beam, radar based ground speed sensor utilizing a single radar integrated circuit includes a single radar integrated circuit configured to generate frequency spectrum data and signal processing circuitry in communication with the single radar integrated circuit. The signal processing circuitry includes at least one processor and at least one memory having computer coded instructions. The computer-coded instructions are configured to, in execution with the processor, configure the signal processing circuitry to receive feedback frequency spectrum data from two or more directed frequency spectrum data beams reflecting of an obstructing surface and determine a ground speed based at least in part on the signal measurements of the returning feedback frequency spectrum data.

18 Claims, 7 Drawing Sheets

(56)     References Cited

U.S. PATENT DOCUMENTS

2011/0074621 A1\*  3/2011  Wintermantel ...... H01Q 1/3233
                                                      342/70
2012/0139777 A1\*  6/2012  Hunter ................ G01S 13/5242
                                                      342/175
2015/0171511 A1\*  6/2015  Pleva ....................... H01Q 1/52
                                                      343/841
2015/0244447 A1\*  8/2015  Wang ................... H04B 7/0697
                                                      375/267
2020/0110153 A1\*  4/2020  Seler ..................... G01S 7/4026
2022/0196823 A1\*  6/2022  Burke ................... G01S 7/2921

OTHER PUBLICATIONS

Parviainen, Jussi et al., "Doppler Radar and MEMS Gyro Augmented DGPS for Large Vehicle Navigation," Researchgate.net, 7 pgs., Mar. 4, 2014.

\* cited by examiner

126

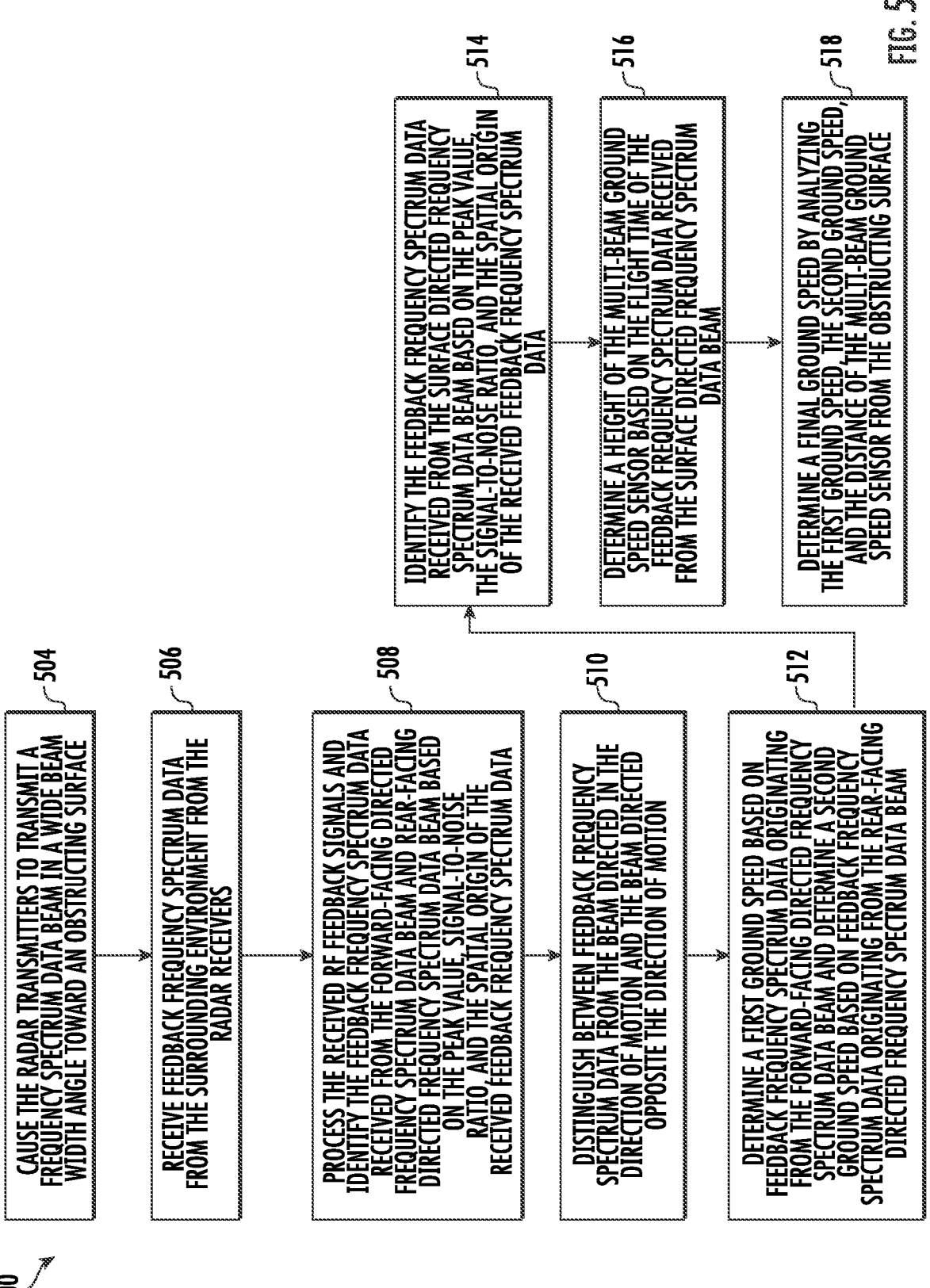

500

504 — CAUSE THE RADAR TRANSMITTERS TO TRANSMIT A FREQUENCY SPECTRUM DATA BEAM IN A WIDE BEAM WIDTH ANGLE TOWARD AN OBSTRUCTING SURFACE

506 — RECEIVE FEEDBACK FREQUENCY SPECTRUM DATA FROM THE SURROUNDING ENVIRONMENT FROM THE RADAR RECEIVERS

508 — PROCESS THE RECEIVED RF FEEDBACK SIGNALS AND IDENTIFY THE FEEDBACK FREQUENCY SPECTRUM DATA RECEIVED FROM THE FORWARD-FACING DIRECTED FREQUENCY SPECTRUM DATA BEAM AND REAR-FACING DIRECTED FREQUENCY SPECTRUM DATA BEAM BASED ON THE PEAK VALUE, SIGNAL-TO-NOISE RATIO, AND THE SPATIAL ORIGIN OF THE RECEIVED FEEDBACK FREQUENCY SPECTRUM DATA

510 — DISTINGUISH BETWEEN FEEDBACK FREQUENCY SPECTRUM DATA FROM THE BEAM DIRECTED IN THE DIRECTION OF MOTION AND THE BEAM DIRECTED OPPOSITE THE DIRECTION OF MOTION

512 — DETERMINE A FIRST GROUND SPEED BASED ON FEEDBACK FREQUENCY SPECTRUM DATA ORIGINATING FROM THE FORWARD-FACING DIRECTED FREQUENCY SPECTRUM DATA BEAM AND DETERMINE A SECOND GROUND SPEED BASED ON FEEDBACK FREQUENCY SPECTRUM DATA ORIGINATING FROM THE REAR-FACING DIRECTED FREQUENCY SPECTRUM DATA BEAM

514 — IDENTIFY THE FEEDBACK FREQUENCY SPECTRUM DATA RECEIVED FROM THE SURFACE DIRECTED FREQUENCY SPECTRUM DATA BEAM BASED ON THE PEAK VALUE, THE SIGNAL-TO-NOISE RATIO, AND THE SPATIAL ORIGIN OF THE RECEIVED FEEDBACK FREQUENCY SPECTRUM DATA

516 — DETERMINE A HEIGHT OF THE MULTI-BEAM GROUND SPEED SENSOR BASED ON THE FLIGHT TIME OF THE FEEDBACK FREQUENCY SPECTRUM DATA RECEIVED FROM THE SURFACE DIRECTED FREQUENCY SPECTRUM DATA BEAM

518 — DETERMINE A FINAL GROUND SPEED BY ANALYZING THE FIRST GROUND SPEED, THE SECOND GROUND SPEED, AND THE DISTANCE OF THE MULTI-BEAM GROUND SPEED SENSOR FROM THE OBSTRUCTING SURFACE

FIG. 5

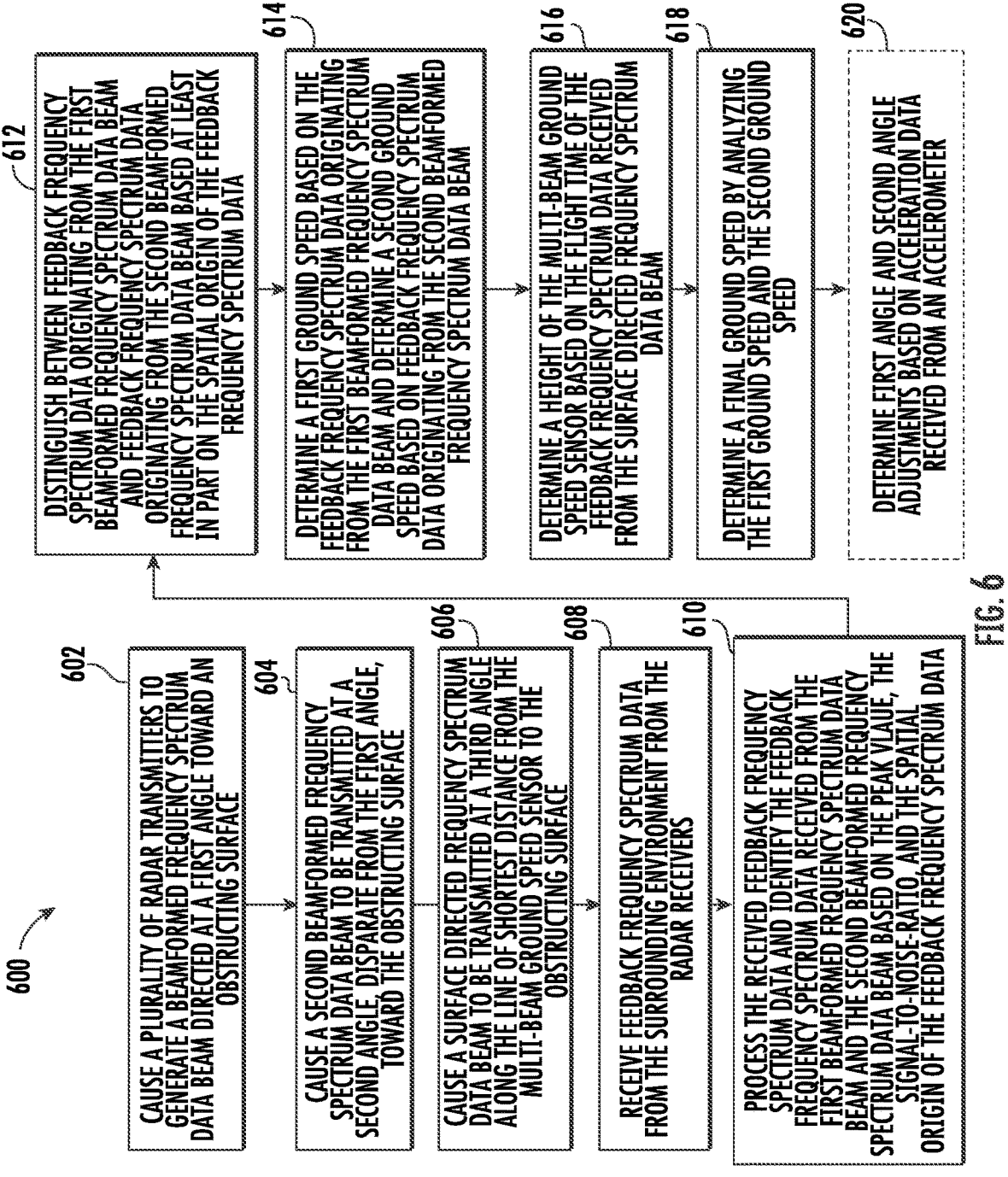

602 CAUSE A PLURALITY OF RADAR TRANSMITTERS TO GENERATE A BEAMFORMED FREQUENCY SPECTRUM DATA BEAM DIRECTED AT A FIRST ANGLE TOWARD AN OBSTRUCTING SURFACE

604 CAUSE A SECOND BEAMFORMED FREQUENCY SPECTRUM DATA BEAM TO BE TRANSMITTED AT A SECOND ANGLE, DISPARATE FROM THE FIRST ANGLE, TOWARD THE OBSTRUCTING SURFACE

606 CAUSE A SURFACE DIRECTED FREQUENCY SPECTRUM DATA BEAM TO BE TRANSMITTED AT A THIRD ANGLE ALONG THE LINE OF SHORTEST DISTANCE FROM THE MULTI-BEAM GROUND SPEED SENSOR TO THE OBSTRUCTING SURFACE

608 RECEIVE FEEDBACK FREQUENCY SPECTRUM DATA FROM THE SURROUNDING ENVIRONMENT FROM THE RADAR RECEIVERS

610 PROCESS THE RECEIVED FEEDBACK FREQUENCY SPECTRUM DATA AND IDENTIFY THE FEEDBACK FREQUENCY SPECTRUM DATA RECEIVED FROM THE FIRST BEAMFORMED FREQUENCY SPECTRUM DATA BEAM AND THE SECOND BEAMFORMED FREQUENCY SPECTRUM DATA BEAM BASED ON THE PEAK VLAUE, THE SIGNAL-TO-NOISE-RATIO, AND THE SPATIAL ORIGIN OF THE FEEDBACK FREQUENCY SPECTRUM DATA

612 DISTINGUISH BETWEEN FEEDBACK FREQUENCY SPECTRUM DATA ORIGINATING FROM THE FIRST BEAMFORMED FREQUENCY SPECTRUM DATA BEAM AND FEEDBACK FREQUENCY SPECTRUM DATA ORIGINATING FROM THE SECOND BEAMFORMED FREQUENCY SPECTRUM DATA BEAM BASED AT LEAST IN PART ON THE SPATIAL ORIGIN OF THE FEEDBACK FREQUENCY SPECTRUM DATA

614 DETERMINE A FIRST GROUND SPEED BASED ON THE FEEDBACK FREQUENCY SPECTRUM DATA ORIGINATING FROM THE FIRST BEAMFORMED FREQUENCY SPECTRUM DATA BEAM AND DETERMINE A SECOND GROUND SPEED BASED ON FEEDBACK FREQUENCY SPECTRUM DATA ORIGINATING FROM THE SECOND BEAMFORMED FREQUENCY SPECTRUM DATA BEAM

616 DETERMINE A HEIGHT OF THE MULTI-BEAM GROUND SPEED SENSOR BASED ON THE FLIGHT TIME OF THE FEEDBACK FREQUENCY SPECTRUM DATA RECEIVED FROM THE SURFACE DIRECTED FREQUENCY SPECTRUM DATA BEAM

618 DETERMINE A FINAL GROUND SPEED BY ANALYZING THE FIRST GROUND SPEED AND THE SECOND GROUND SPEED

620 DETERMINE FIRST ANGLE AND SECOND ANGLE ADJUSTMENTS BASED ON ACCELERATION DATA RECEIVED FROM AN ACCELEROMETER

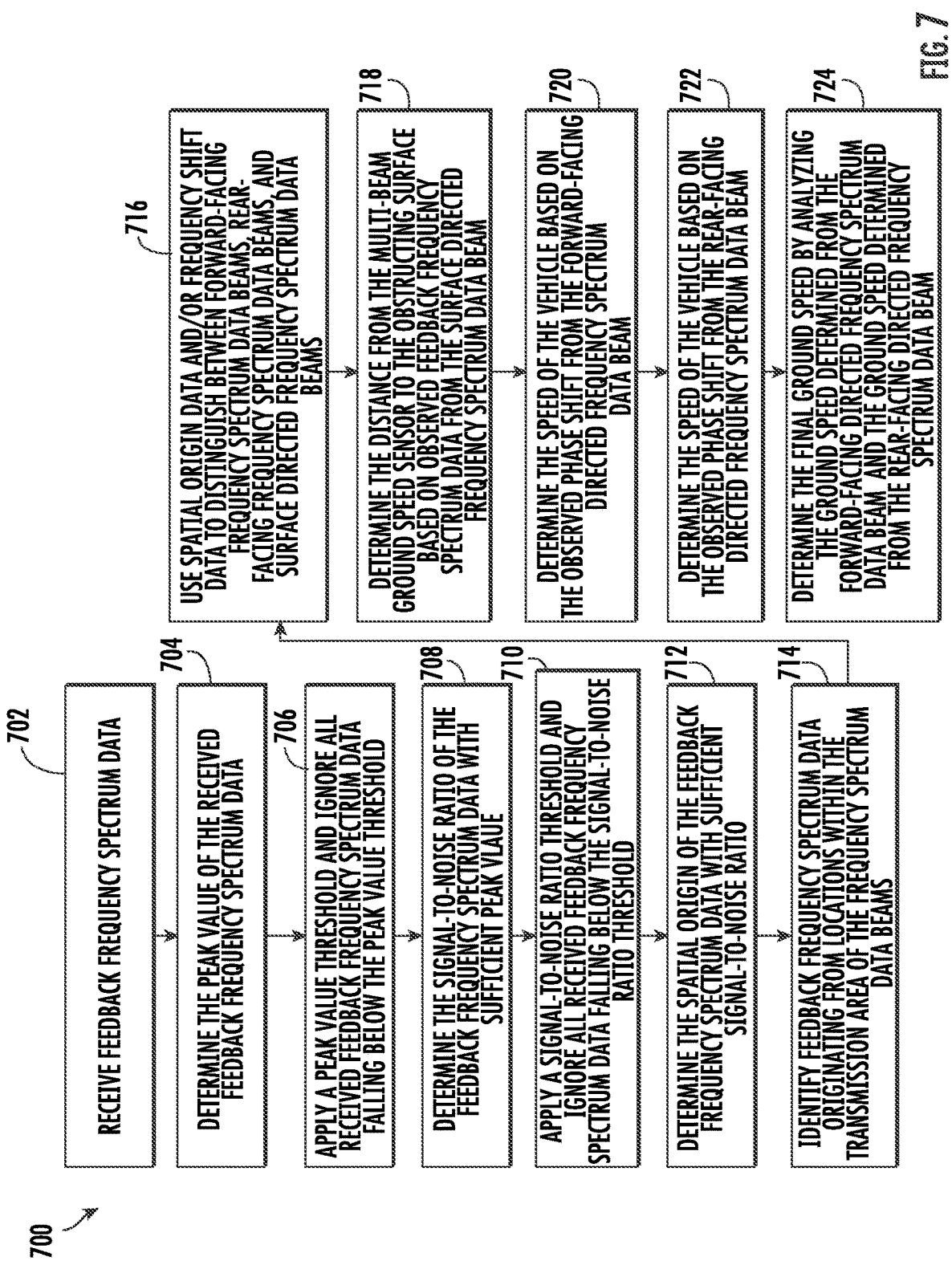

702 RECEIVE FEEDBACK FREQUENCY SPECTRUM DATA

704 DETERMINE THE PEAK VALUE OF THE RECEIVED FEEDBACK FREQUENCY SPECTRUM DATA

706 APPLY A PEAK VALUE THRESHOLD AND IGNORE ALL RECEIVED FEEDBACK FREQUENCY SPECTRUM DATA FALLING BELOW THE PEAK VALUE THRESHOLD

708 DETERMINE THE SIGNAL-TO-NOISE RATIO OF THE FEEDBACK FREQUENCY SPECTRUM DATA WITH SUFFICIENT PEAK VLAUE

710 APPLY A SIGNAL-TO-NOISE RATIO THRESHOLD AND IGNORE ALL RECEIVED FEEDBACK FREQUENCY SPECTRUM DATA FALLING BELOW THE SIGNAL-TO-NOISE RATIO THRESHOLD

712 DETERMINE THE SPATIAL ORIGIN OF THE FEEDBACK FREQUENCY SPECTRUM DATA WITH SUFFICIENT SIGNAL-TO-NOISE RATIO

714 IDENTIFY FEEDBACK FREQUENCY SPECTRUM DATA ORIGINATING FROM LOCATIONS WITHIN THE TRANSMISSION AREA OF THE FREQUENCY SPECTRUM DATA BEAMS

716 USE SPATIAL ORIGIN DATA AND/OR FREQUENCY SHIFT DATA TO DISTINGUISH BETWEEN FORWARD-FACING FREQUENCY SPECTRUM DATA BEAMS, REAR-FACING FREQUENCY SPECTRUM DATA BEAMS, AND SURFACE DIRECTED FREQUENCY SPECTRUM DATA BEAMS

718 DETERMINE THE DISTANCE FROM THE MULTI-BEAM GROUND SPEED SENSOR TO THE OBSTRUCTING SURFACE BASED ON OBSERVED FEEDBACK FREQUENCY SPECTRUM DATA FROM THE SURFACE DIRECTED FREQUENCY SPECTRUM DATA BEAM

720 DETERMINE THE SPEED OF THE VEHICLE BASED ON THE OBSERVED PHASE SHIFT FROM THE FORWARD-FACING DIRECTED FREQUENCY SPECTRUM DATA BEAM

722 DETERMINE THE SPEED OF THE VEHICLE BASED ON THE OBSERVED PHASE SHIFT FROM THE REAR-FACING DIRECTED FREQUENCY SPECTRUM DATA BEAM

724 DETERMINE THE FINAL GROUND SPEED BY ANALYZING THE GROUND SPEED DETERMINED FROM THE FORWARD-FACING DIRECTED FREQUENCY SPECTRUM DATA BEAM  AND THE GROUND SPEED DETERMINED FROM THE REAR-FACING DIRECTED FREQUENCY SPECTRUM DATA BEAM

MULTI-BEAM RADAR BASED GROUND SPEED SENSOR UTILIZING A SINGLE RADAR INTEGRATED CIRCUIT

CROSS-REFERENCE TO RELATED APPLICATIONS

This application claims priority pursuant to 35 U.S.C. 119(a) to Indian Application No. 202211044678, filed Aug. 4, 2022, which application is incorporated herein by reference in its entirety.

TECHNOLOGICAL FIELD

Embodiments of the present disclosure relate generally to an apparatus for detecting the ground speed velocity of a vehicle in motion using a multi-beam radar emanating from a single radar integrated circuit packaged with one or more transmitters and receivers.

BACKGROUND

Applicant has identified many technical challenges and difficulties associated with determining the true ground speed of a vehicle using mechanically coupled speed sensing systems, single beam ground speed sensors, and conventional dual-beam ground speed sensors. Through applied effort, ingenuity, and innovation, Applicant has solved problems relating to these ground speed sensors by developing solutions embodied in the present disclosure, which are described in detail below.

BRIEF SUMMARY

Various embodiments are directed to an example true ground speed sensor apparatus, as well as a computer-implement method for measuring the true ground speed.

In accordance with some embodiments of the present disclosure, an example true ground speed sensor apparatus is provided. In some embodiments, the example true ground speed sensor apparatus comprises a single radar integrated circuit (IC) configured to generate frequency spectrum data and signal processing circuitry in communication with the single radar integrated circuit (IC). In some embodiments, the signal processing circuitry comprises at least one processor and at least one memory, the at least one memory having computer-coded instructions thereon. In some embodiments, the computer-coded instructions may be configured to, in execution with the at least one processor, configure the signal processing circuitry to (1) receive feedback frequency spectrum data resulting from two or more directed frequency spectrum data beams reflecting off an obstructing surface at two or more disparate angles and (2) determine a ground speed based at least in part on the phase-shift measurements of the feedback frequency spectrum data.

In some embodiments, the example true ground speed sensor apparatus further comprises an enclosure defining a transmission axis. In some embodiments, the enclosure further comprises one or more radar transmitters coupled to the enclosure and configured to transmit the frequency spectrum data in a frequency spectrum data beam along the transmission axis and toward the obstructing surface. In some embodiments, a radio frequency absorbent material is positioned between the one or more radar transmitters, such that the radio frequency absorbent material substantially blocks the frequency spectrum data beam proximate the transmission axis creating two directed frequency spectrum data beams.

In some embodiments, the signal processing circuitry may be configured to ignore feedback frequency spectrum data reflecting off the obstructing surface proximate the transmission axis of the frequency spectrum data beam.

In some embodiments, the beam width of the frequency spectrum data beam may be increased by utilizing a plurality of radar transmitters positioned to transmit at disparate transmit angles.

In some embodiments, the beam width of the frequency spectrum data beam may be greater than 90 degrees and less than 150 degrees.

In some embodiments, a plurality of transmitters may generate a beamformed frequency spectrum data beam capable of being directed toward the obstructing surface at different angles to produce two or more distinct frequency spectrum data beams.

In some embodiments, the beamformed frequency spectrum data beam may have a beam width less than 30 degrees and greater than or equal to 1 degree.

In some embodiments, the true ground speed sensor apparatus may further comprise an accelerometer communicatively connected to the signal processing circuitry, wherein the signal processing circuitry is configured to compensate for changes in position in the yaw, pitch, or roll directions relative to the direction of motion based at least in part on acceleration data generated by the accelerometer.

In some embodiments, the true ground speed sensor apparatus may further comprise a surface directed frequency spectrum data beam directed toward the obstructing surface at an angle along the line of shortest distance to the obstructing surface.

In some embodiments, the height of the true ground speed sensor apparatus may be determined based at least in part on the feedback frequency spectrum data resulting from the surface directed frequency spectrum data beam.

An example computer-implemented method for measuring the true ground speed is further included.

The computer-implemented method for measuring a true ground speed may comprise causing a single integrated circuit radar and one or more radar transmitters to transmit two or more directed frequency data beams toward an obstructing surface. In some embodiments, the example computer-implemented method may include receiving feedback frequency spectrum data from one or more radar receivers, identifying feedback frequency spectrum data received from the two or more directed frequency data beams, and determining a ground speed based at least in part on phase-shift measurements of the feedback frequency spectrum data received from the one or more directed frequency data beams.

In some embodiments, the feedback frequency spectrum data received from the two or more directed frequency data beams may be identified based at least in part on the peak-value, signal-to-noise ratio, and spatial origin of the feedback frequency spectrum data.

In some embodiments, the one or more radar transmitters may be coupled to transmit the frequency spectrum data in a frequency spectrum data beam along a transmission axis and toward the obstructing surface at a wide beam width angle. In some embodiments, a radio frequency absorbent material may be positioned between the one or more radar transmitters, such that the radio frequency absorbent material substantially blocks the frequency spectrum data beam proximate the transmission axis creating the two or more directed frequency spectrum data beams.

In some embodiments, a forward-facing directed frequency spectrum data beam and a rear-facing directed frequency spectrum data beam of the two or more directed frequency spectrum data beams may be created.

In some embodiments, the computer-implemented method may further comprise distinguishing between feedback frequency spectrum data received from the forward-facing directed frequency spectrum data beam and the rear-facing frequency spectrum data beam. In some embodiments, the computer-implemented method may further comprise determining a first ground speed based on the feedback frequency spectrum data of the forward-facing directed frequency spectrum data beam, determining a second ground speed based on the feedback frequency spectrum data of the rear-facing directed frequency spectrum data beam, and determining the true ground speed based at least in part on the first ground speed and the second ground speed.

In some embodiments, the beam width angle may be greater than 90 degrees and less than 180 degrees.

In some embodiments, a plurality of radar transmitters may generate a beamformed frequency spectrum data beam capable of being directed toward the obstructing surface at different angles to produce two or more distinct frequency spectrum data beams.

In some embodiments, the angles of the two or more distinct frequency spectrum data beams may be adjusted to compensate for changes in position in the yaw, pitch, or roll directions relative to the direction of motion based at least in part based on acceleration data received from an accelerometer.

In some embodiments, the computer-implemented method may further comprise causing a first beamformed frequency spectrum data beam to be transmitted at a first angle and causing a second beamformed frequency spectrum data beam to be transmitted at a second angle. In some embodiments, the computer-implemented method may further comprise distinguishing between feedback frequency spectrum data received from the frequency spectrum data beam transmitted at the first angle and feedback frequency spectrum data received from the frequency spectrum data beam transmitted at the second angle. In some embodiments, the computer-implemented method may further comprise determining a first ground speed based on the feedback frequency spectrum data of the frequency spectrum data beam transmitted at the first angle, determining a second ground speed based on the feedback frequency spectrum data of the frequency spectrum data beam transmitted at the second angle, and determining the true ground speed based at least in part on the first ground speed and the second ground speed.

In some embodiments, the computer-implemented method may further comprise ignoring feedback frequency spectrum data reflecting off the obstructing surface proximate the transmission axis of the frequency spectrum data beam.

In some embodiments, the data reflecting off the obstructing surface proximate the transmission axis may be ignored based at least in part on the magnitude and spatial origin of the feedback frequency spectrum data.

In some embodiments, the computer-implemented method may further comprise causing a surface directed frequency spectrum data beam to be transmitted toward the obstructing surface at an angle along a line of shortest distance to the obstructing surface.

In some embodiments, a height may be determined based at least in part on the feedback frequency spectrum data resulting from the surface directed frequency spectrum data beam.

An example computer program product for measuring the true ground speed is further included.

In some embodiments, the computer program product may comprise at least one non-transitory computer-readable storage medium having computer-executable program code instructions comprising program instructions to cause a single integrated circuit radar and one or more radar transmitters to transmit two or more directed frequency data beams toward an obstructing surface. In some embodiments the computer program product may be further configured to receive feedback frequency spectrum data from one or more radar receivers, identify feedback frequency spectrum data received from the two or more directed frequency data beams, and determine a true ground speed based at least in part on the feedback frequency spectrum data received from the one or more directed frequency data beams.

BRIEF DESCRIPTION OF THE DRAWINGS

Reference will now be made to the accompanying drawings. The components illustrated in the figures may or may not be present in certain embodiments described herein. Some embodiments may include fewer (or more) components than those shown in the figures in accordance with an example embodiment of the present invention.

FIG. 5 depicts a flowchart illustrating operations performed by a multi-beam ground speed sensor to determine an accurate ground speed in accordance with an example embodiment of the present invention.

FIG. 6 depicts a flowchart illustrating operations performed by a multi-beam ground speed sensor to determine an accurate ground speed in accordance with an example embodiment of the present invention.

FIG. 7 depicts a flowchart illustrating operations performed by signal processing circuitry to determine an accurate ground speed in accordance with an example embodiment of the present invention.

DETAILED DESCRIPTION

Figure 1:
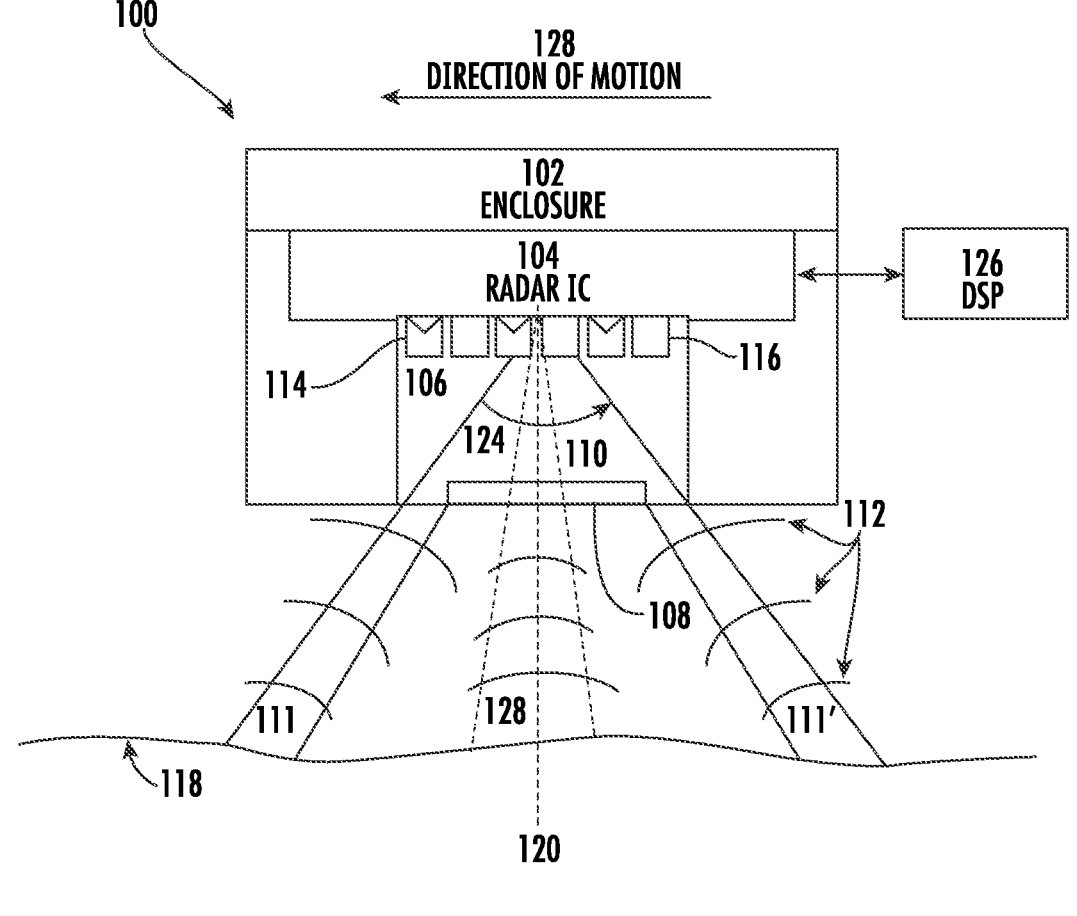
FIG. 1 depicts an example multi-beam ground speed sensor in accordance with an example embodiment of the present invention.

Example embodiments will be described more fully hereinafter with reference to the accompanying drawings, in which some, but not all embodiments of the inventions are shown. Indeed, embodiments of the invention may be embodied in many different forms and should not be construed as limited to the embodiments set forth herein; rather, these embodiments are provided so that this disclosure will satisfy applicable legal requirements. Like numbers refer to like elements throughout.

Overview

Various example embodiments address technical problems associated with determining an accurate ground speed of a vehicle in motion. As understood by those of skill in the field to which the present disclosure pertains, true ground speed may be determined by emitting a radar signal, receiving the feedback signal reflected from the surface of the ground, and determining the vehicle's speed based on a change in phase due to the doppler effect. The accuracy of the determined speed is highly susceptible to changes in the terrain and shifts in the vehicle's dynamics. For example, if a vehicle is making a turn and the roll angle of the car shifts in relation to the surface of the ground, this may be detected as an increase or decrease in the vehicle's velocity.

One example solution to this problem is to transmit and receive multiple radar beams, ideally, one in the direction of motion ("forward-facing") and one opposite the direction of motion ("rear-facing"). The speed of the vehicle can be calculated based on the doppler shift of the returned beams and the actual speed may be determined by averaging the calculated speeds, performing a weighted average, and/or selecting one calculated speed and rejecting the other (e.g., a shift in the vehicle's position relative to the surface of the ground may lead to an increase in the speed calculation for the forward facing beam but will lead to a decrease in the speed calculation for the rear facing beam). By averaging the two calculated speeds, a more accurate determination of the actual speed is reached in some examples. However, implementing a true ground speed sensor with multiple beams has previously required a device with at least two radar systems. These devices require at least two radar integrated circuits, separate transmitters, separate receivers, and separate wave guides. Duplication of these components results in a true ground speed sensor that is more expensive to manufacture, has a large form factor, and requires more power to operate. In some examples, various embodiments described in the present disclosure herein are directed to solving these technical challenges related to obtaining a true ground speed determination and are developed through applied ingenuity, effort, and innovation.

The integrated circuit (IC) ground speed sensor, which in some examples is limited to a single radar IC in an antenna-on-package form, disclosed herein utilizes various techniques to generate feedback frequency spectrum data from multiple disparate angles. For example, in some embodiments, a single radar beam spanning a wide beam width angle is generated by the radar IC. The transmission axis of the wide radar beam is pointed parallel or substantially parallel to the normal of the surface of the ground. A radio frequency (RF) absorbent coating is placed between the radar IC and the surface of the ground proximate to the transmission axis, substantially blocking the RF signals proximate the transmission axis but allowing beams to pass by at the two edges of the radar beam. The process of adding a coating, in effect, creates two directed spectrum data beams, one forward-facing, and the other rear-facing. By calculating the speed of the vehicle using the reflected frequency spectrum data from each of the directed spectrum data beams, an accurate determination of the vehicles speed may be determined.

Also discussed herein, a multi-beam ground speed sensor may utilize, in some examples, an array of receivers to determine the spatial coordinates of the reflected frequency spectrum data. Once the origin of the reflected frequency spectrum data is determined, a digital signal processor (DSP) configured to calculate the vehicle's speed, may selectively remove reflected frequency spectrum data originating from angles proximate the normal of the surface of the ground.

In addition, as further discussed herein, the multi-beam ground speed sensor may utilize, in some examples, a combination of the RF absorbent coating and a determination of the spatial origin of the reflected frequency spectrum data to remove undesired reflected frequency spectrum data and accurately determine the vehicle's speed.

In another embodiment, the multi-beam ground speed sensor utilizes, in some examples an array of transmitters to generate a focused beamform, creating a narrow transmission beam. This transmission beam may be directed within the field of transmission of the transmitter array. By rapidly shifting between a forward-facing, narrowly focused beam and a rear-facing narrowly focused beam, this ground speed sensor may emulate a multi-beam sensor and realize improvements in accuracy, in some examples.

In addition, as further discussed herein, the multi-beam ground speed sensor may utilize, in some examples, a radar beam directed at the surface of the ground at an angle along the shortest distance from the multi-beam ground speed sensor to the ground. Utilizing the feedback from such a transmission beam allows the multi-beam ground speed sensor to determine a height of the unit from the ground using time-in-flight data. The height determination may be another factor in realizing improvements in accuracy in the ground speed determination, in some examples.

As a result of the herein described embodiments and in some examples, the accuracy of the multi-beam ground speed sensor may be improved without the increase in size, cost, and power required by previous multi-beam solutions.

Figure 4:
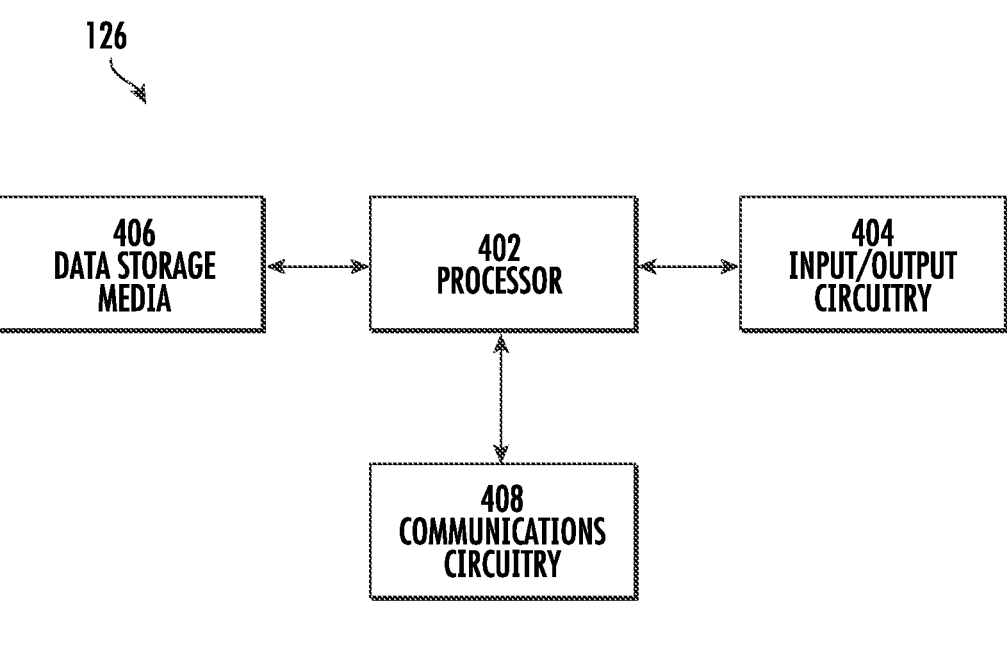
FIG. 4 illustrates an example block diagram showing example components associated with example signal processing circuitry in accordance with some embodiments of the present disclosure.

FIG. 1 illustrates a block diagram of a multi-beam ground speed sensor 100 according to various embodiments described herein. The multi-beam ground speed sensor 100 is configured to, in some examples, accurately and reliably determine the speed of a vehicle 302 (as shown in FIG. 4).

The depicted multi-beam ground speed sensor 100 comprises a radar IC 104 coupled to one or more radar transmitters 114 and one or more radar receivers 116. The one or more radar transmitters 114 configured to direct a frequency spectrum data beam 110 with a beam width angle 124 through a radar lens 106 toward an obstructing surface 118 along a transmission axis 120.

In addition, an RF absorbent coating 108 is positioned between the one or more radar transmitters 114 and the obstructing surface 118 along the transmission axis 120. The RF absorbent coating 108 is positioned to substantially block the frequency spectrum data beam 110 along the transmission axis 120 while allowing a narrow portion of the frequency spectrum data beam 110 to pass in the direction of motion 128, creating a forward-facing directed frequency spectrum data beam 111, and allowing a narrow portion of the frequency spectrum data beam 110 to pass in the direction opposite the direction of motion 128, creating a rear-facing directed frequency spectrum data beam 111'. Further, a surface directed frequency spectrum data beam 128 may be transmitted from the radar IC 104 to the obstructing surface 118 at an angle along the shortest distance from the radar IC 104 to the obstructing surface. Additionally, enclosure 102 is configured to enclose or partially enclosed the aforementioned components. Further, signal processing circuitry 126 is communicatively connected to the radar IC 104.

During operation, in some embodiments, the radar IC 104 is configured to generate an electro-magnetic signal at a consistent frequency within the spectrum of radio frequencies. The transmission of that electro-magnetic signal is hereinafter referred to as a frequency spectrum data beam 110. In some embodiments, the signal is generated at a frequency between 21.65 GHz and 26.65 GHz, more preferable at a frequency between 24.0 GHz and 24.25 GHz. In other embodiments, the output frequency of the radar IC 104 may be between 60 GHz and 64 GHz. Still, in other embodiments, the output frequency of the radar IC 104 may be between 77 GHz and 81 GHz.

The frequency spectrum data beam 110 generated by the radar IC 104 is transmitted by one or more radar transmitters 114 coupled to the radar IC 104. In some embodiments, for example, the radar transmitters 114 are coupled to the radar IC 104 in an antenna on package form factor. The radar transmitters 114 in combination with the radar lens 106 directs the frequency spectrum data beam 110 in a pre-determined direction along the transmission axis 120 and at a beam width determined by a beam width angle 124. In some examples, the frequency spectrum data beam 110 is directed along the transmission axis at an angle parallel the normal of the obstructing surface. In some conditions, it may be advantageous to direct the frequency spectrum data beam 110 at an angle in the direction of motion 128 of the normal of the obstruction surface 118. In other examples, it may be advantageous to direct the frequency spectrum data beam 110 at an angled opposite the direction of motion 128 of the normal of the obstruction surface 118.

In some examples and in order to increase the beam width of the transmitted frequency spectrum data beam 110, a radar IC 104 may comprise one or more radar transmitters 114. As depicted in FIG. 1, multiple radar transmitters 114 may be utilized to generate a frequency spectrum data beam 110 with a wide beam width angle 124. In some embodiments, the wide beam width angle 124 may be between 90 and 150 degrees, more preferably between 105 and 135, and even more preferably between 115 and 125 degrees. Indeed, and in some examples, a narrow beam width provides increased accuracy.

As further illustrated in the exemplary embodiment of FIG. 1, an RF absorbent coating 108 may be positioned between the radar transmitters 114 and the obstructing surface 118. The RF absorbent coating 108 may be any coating capable of absorbing substantially all RF electro-magnetic signals, including foams, magnetic materials, paints, liquids, and other materials that absorb RF emissions. The RF absorbent coating 108 is positioned in such a way to absorb the RF electro-magnetic transmissions of the frequency spectrum data beam 110 proximate the transmission axis 120. The RF absorbent coating 108 is preferably positioned to allow the portion of the frequency spectrum data beam 110 furthest away from the transmission axis 120 and at opposite extremes of the frequency spectrum data beam 110 to pass through the radar lens 106. Allowing these two portions of the frequency spectrum data beam 110 to pass results in two directed frequency spectrum data beams 111, 111' with a narrow beam width pointing in opposite directions.

In some embodiments, for example, one of the directed frequency spectrum data beams 111 points in the direction of motion 128 of the vehicle 302 while the other directed frequency spectrum data beam 111' points in the direction opposite the direction of motion 128 of the vehicle 302. In some embodiments, the beam width of the directed frequency spectrum data beam 111, 111' may be between 15 and 30 degrees, more preferrable between 15 and 20 degrees and even more preferably between 15 and 16 degrees.

FIG. 1 further depicts an obstructing surface 118. An obstructing surface 118 may be any surface that appears to be moving relative to the position of the multi-beam ground speed sensor 100. In some embodiments, for example, the obstructing surface 118 may be the surface of a road, gravel, dirt, sand, or any other material supporting the moving vehicle 302.

The directed frequency spectrum data beam 111, 111' may be directed at the obstructing surface 118 such that the electro-magnetic waves of the frequency spectrum data beam 110 are reflected off the obstructing surface 118 and return to the multi-beam ground speed sensor 100 to be received by the radar receivers 116. When the obstructing surface 118 is moving in relation to the multi-beam ground speed sensor 100, the frequency of the feedback frequency spectrum data 112 will change in relation to the frequency of the output frequency spectrum data beam 110. The received feedback frequency spectrum data 112 may be communicated to the signal processing circuitry 126 to perform processing operations.

As depicted in FIG. 1, a surfaced directed frequency spectrum data beam 128 may be transmitted from the multi-beam ground speed sensor 100. In some embodiments, the RF absorbent coating 108 may be positioned to allow the portion of the frequency spectrum data beam 110 along the shortest line from the radar IC 104 to the obstructing surface 118 to pass through the radar lens 106. In other embodiments, the feedback frequency spectrum data 112 along this line may be determined through software processing on the signal processing circuitry 126. This surface directed frequency spectrum data beam 128 may allow the multi-beam ground speed sensor 100 to determine its height from the obstructing surface 118.

As depicted in FIG. 1, the signal processing circuitry 126 may be communicatively connected to the radar IC 104. In some embodiments, the signal processing circuitry 126 may be a part of the same printed circuit board or same integrated circuitry as the radar IC 104. In other embodiments, the signal processing circuitry 126 may be a separate integrated circuit, application specific integrated circuit (ASIC), field-programmable gate array (FPGA), or other processor capable of receiving and processing digital wave signals. The signal processing circuitry 126, for example, may receive the feedback frequency spectrum data 112 received from the radar receivers 116 in digital format. The signal processing circuitry 126 may then determine the feedback frequency spectrum data 112 resulting from reflections off the obstructing surface 118 from the directed frequency spectrum data beams 111, 111' by analyzing the peak value, the signal-to-noise ratio, and the spatial origin of the reflected feedback frequency spectrum data 112. The signal processing circuitry 126, in some examples, may also use the peak value, signal-to-noise ratio, spatial origin, and feedback frequency phase-shift to distinguish between feedback frequency spectrum data 112 resulting from the forward-facing directed frequency spectrum data beam 111 and feedback frequency spectrum data 112 resulting from the rear-facing directed frequency spectrum data beam 111'.

The signal processing circuitry 126 may determine a change in phase between the frequency spectrum data beam 110 and the phase of the feedback frequency spectrum data 112 received from both directed frequency spectrum data beams 111, 111'. The change in phase may be used to determine a first and second ground speed of the vehicle 302 based on the forward-facing directed frequency spectrum data beam 111 and also based on the rear-facing directed frequency spectrum data beam 111' according to the doppler effect.

In some examples, the first and second calculated ground speeds may then be used to determine a more accurate ground speed. For example, the two ground speeds may be averaged to compensate for shifting of the vehicle in relation to the obstructing surface 118, which may cause an increase in speed in the forward-facing directed frequency spectrum data beam 111 and a decrease in speed in the rear-facing directed frequency spectrum data beam 111'.

As further illustrated in FIG. 1, a multi-beam ground speed sensor 100 may comprise a enclosure 102 for preventing RF signals from being transmitted in unwanted directions, and for preventing the multi-beam ground speed sensor 100 from receiving RF signals from outside sources. The enclosure 102 may enclose all sides of the multi-beam ground speed sensor 100 with the exception of the direction of transmission of the frequency spectrum data beam 110 along the transmission axis 120, in some embodiments. In other embodiments, the enclosure 102 may enclose the side opposite the direction of transmission of the frequency spectrum data beam 110. The enclosure 102 may be made of metal, in some embodiments, or any material capable of shielding RF emissions.

Figure 2:
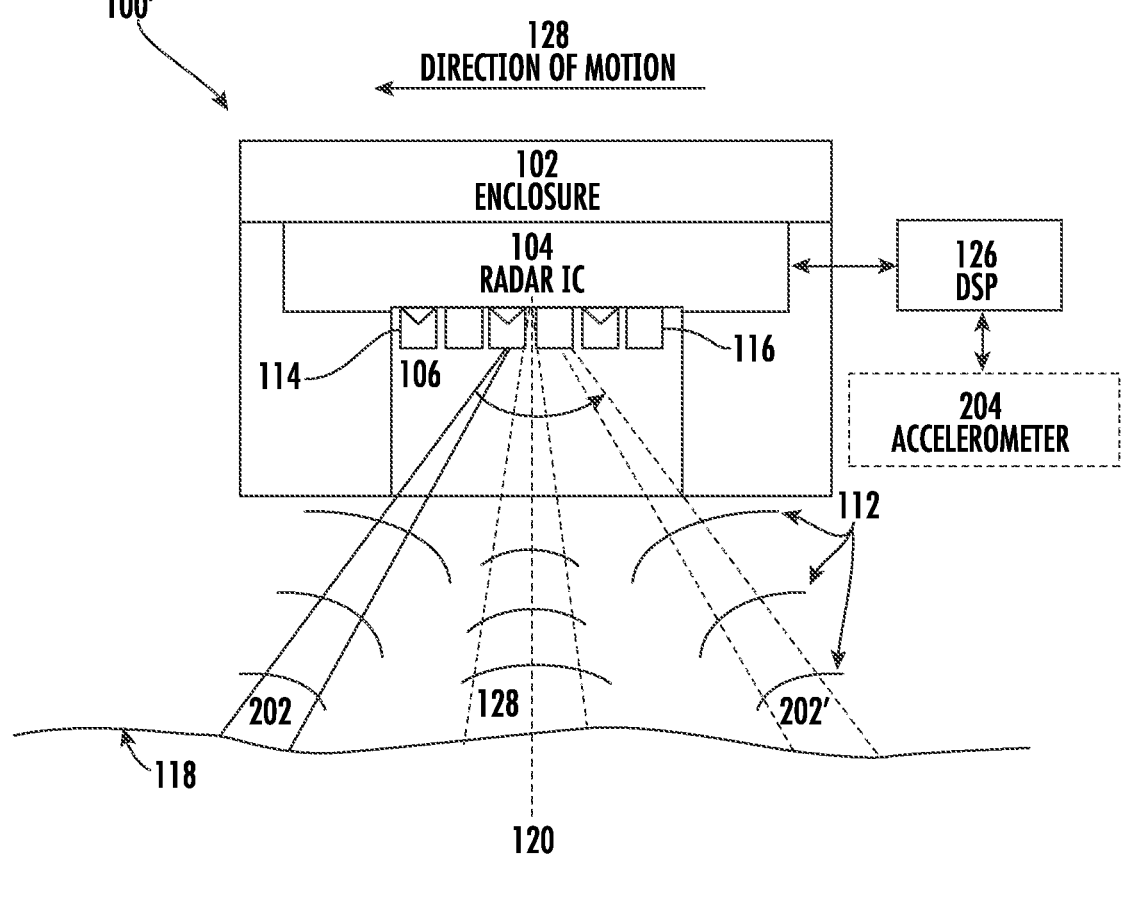
FIG. 2 depicts another example multi-beam ground speed sensor in accordance with an example embodiment of the present invention.

FIG. 2 illustrates a block diagram of another embodiment of a multi-beam ground speed sensor 100' according to various embodiments described herein. The depicted embodiment of FIG. 2 comprises a radar IC 104 coupled to one or more radar transmitters 114 and one or more radar receivers 116 directing a first beamformed frequency spectrum data beam 202 through a radar lens 106 toward an obstructing surface 118. In addition, a second beamformed frequency spectrum data beam 202' is depicted directed toward the obstructing surface 118 at a different angle relative to the transmission axis 120 and at a different time than the first beamformed frequency spectrum data beam 202. In addition, a surface directed frequency spectrum data beam 128 may be directed at the obstructing surface on the shortest line from the radar IC 104 to the obstructing surface 118. Attached to the radar IC 104 on the side opposite the obstructive surface 118, is an enclosure 102. Further, signal processing circuitry 126 is communicatively connected to the radar IC 104. In some embodiments, an accelerometer 204 may also be communicatively connected to the signal processing circuitry 126.

As illustrated in FIG. 2, the multi-beam ground speed sensor 100' may be configured to generate a first beamformed frequency spectrum data beam 202 capable of dynamic movement. In some embodiments, the multi-beam ground speed sensor 100' may utilize an array of radar transmitters 114 to generate a focused beam using one or more beamforming techniques. For example, the radar IC 104 may be configured to manipulate the phase on each of the radar transmitters 114 such that the output RF electro-magnetic signals of each of the radar transmitters 114 converge in a specified direction, creating a first beamformed frequency spectrum data beam 202 as depicted in FIG. 2. The direction of the first beamformed frequency spectrum data beam 202 may be further controlled through adjusting the phase delay on each of the radar transmitters 114. Thus, by controlling the phase of the output of the RF electro-magnetic signals the first beamformed frequency spectrum data beam 202 may be pointed in a desired direction. The beam width of the first beamformed frequency spectrum data beam 202 is largely dependent on the configuration and number of the radar transmitters 114.

In some embodiments, the multi-beam ground speed sensor 100' may comprise as few as three radar transmitters 114 capable of operating with a directed beamformed frequency spectrum data beam 202 comprising a beam width between 7 and 30 degrees, preferably between 7 and 15 degrees, even more preferably between 7 and 10 degrees. In other embodiments, the multi-beam ground speed sensor 100' may comprise a 16×16 array of radar transmitters 114 capable of operating with a beamformed frequency spectrum data beam 202 comprising a beam width between 1 and 30 degrees, preferably between 1 and 15 degrees, even more preferably between 1 and 2 degrees. The ability to produce a beamformed frequency spectrum data beam 202 with a narrow beam width is beneficial, in some examples, in providing more accurate reflection data and more accurate speed calculations. In some embodiments, the radar IC 104 may be an antenna on package form factor on which the radar IC 104, the transceiver, the radar transmitters 114, and the radar receivers 116 are all contained in a single IC package.

Once the beamformed frequency spectrum data beam 202 is created and focused in a particular direction, the beamformed frequency spectrum data beam 202 will interact with the obstructing surface 118 and RF electro-magnetic waves may be reflected as feedback frequency spectrum data 112. The feedback frequency spectrum data 112 from the beamformed frequency spectrum data beam 202 may be received at the radar receivers 116, along with other feedback and reflections resulting from RF electro-magnetic signal interactions outside of the beamformed frequency spectrum data beam 202. The radar receivers 116 receive these RF feedback signals and communicate the received RF electro-magnetic signal feedback to the signal processing circuitry 126 for processing. In some embodiments, the signal processing circuitry 126 is capable of identifying feedback data received resulting from the beamformed frequency spectrum data beam 202 based on the magnitude of the RF electro-magnetic signal received and the spatial location of the origin from which the received RF electro-magnetic signal emanated. Once the feedback frequency spectrum data 112 resulting from the beamformed frequency spectrum data beam 202 is determined, the ground speed of the vehicle 302 may then be calculated by the signal processing circuitry 126 based on the doppler effect, in part by determining the frequency of the feedback frequency spectrum data 112 compared with the transmitted frequency of the beamformed frequency spectrum data beam 202.

In some examples, creating a beamformed frequency spectrum data beam 202 using beamforming techniques allows a multi-beam ground speed sensor 100' to dynamically change the location of the beamformed frequency spectrum data beam 202 (202'). By rapidly switching between a forward-facing beamformed frequency spectrum data beam 202 and a rear-facing beamformed frequency spectrum data beam 202', the multi-beam ground speed sensor 100' may obtain increased accuracy in ground speed calculation. For example, the signal processing circuitry 126 may manipulate the output of each of the transmitters to point the beamformed frequency spectrum data beam 202 forward at an angle of 50 degrees from the transmission axis 120. The signal processing circuitry 126 may then configure the beamformed frequency spectrum data beam 202 to point in a rear facing direction (202').

Using filters based on the magnitude of the received feedback frequency spectrum data 112 and the spatial origin of the feedback frequency spectrum data 112, the signal processing circuitry 126 may then distinguish between the signals resulting from the forward-facing beamformed frequency spectrum data beam 202 and the rear-facing beamformed frequency spectrum data beam 202'. In some examples, the signal processing circuitry 126 may then calculate the speed based on the frequency change detected from each beamformed frequency spectrum data beam 202 and combine those values to determine a ground speed. In some embodiments, the angle of the beamformed frequency spectrum data beam 202 and beamformed frequency spectrum data beam 202' may be dynamically adjusted based on terrain to provide more accurate feedback frequency spectrum data 112 and a more accurate speed calculation. In addition, the beamformed frequency spectrum data beam 202 may be dynamically adjusted based on feedback from an accelerometer 204 or other system feedback, to provide more accurate feedback frequency spectrum data 112.

As further depicted in FIG. 2, in some embodiments the multi-beam ground speed sensor 100' may comprise an accelerometer 204 communicatively connected to the signal processing circuitry 126. An accelerometer 204 may be configured to detect shifts in position of the vehicle 302 relative to the obstructing surface 118, such as yaw, pitch, and roll.

In some examples, the signal processing circuitry 126 may utilize the accelerometer 204 data to adjust the calculated speed or the direction of the beamformed frequency spectrum data beam 202. For example, feedback from the accelerometer 204 may indicate that the vehicle has shifted in the positive roll direction in relation to the direction of motion. The angle of the beamformed frequency spectrum data beam 202 and beamformed frequency spectrum data beam 202' may be adjusted to compensate for this change in vehicle position. Additionally, in some embodiments, the radar transmitters 114 may be configured to generate more than two beamformed frequency spectrum data beams 202. By adding additional beamformed frequency spectrum data beams 202 in multiple dimensions, the multi-beam ground speed sensor 100' may be configured to compensate for shifting of the vehicle in all three dimensions.

As further depicted in FIG. 2, in some embodiments, one or more beamformed frequency spectrum data beams 202, 202' may be directed at an angle along the shortest line from the radar IC 104 to the obstructing surface 118. For example, a beamformed frequency spectrum data beam 202, 202' may be directed at an angle perpendicular to the direction of motion 128 toward the obstructing surface 118. The multi-beam ground speed sensor 100' may be configured to capture the feedback frequency spectrum data 112 from the beamformed frequency spectrum data beam 202, 202' and use the measured frequency to calculate the distance from the multi-beam ground speed sensor 100' to the obstructing surface 118 using time-in-flight data. This height may be used by the multi-beam ground speed sensor 100' to calibrate the multi-beam ground speed sensor 100' and further improve the accuracy of the calculated ground speed.

Figure 3:
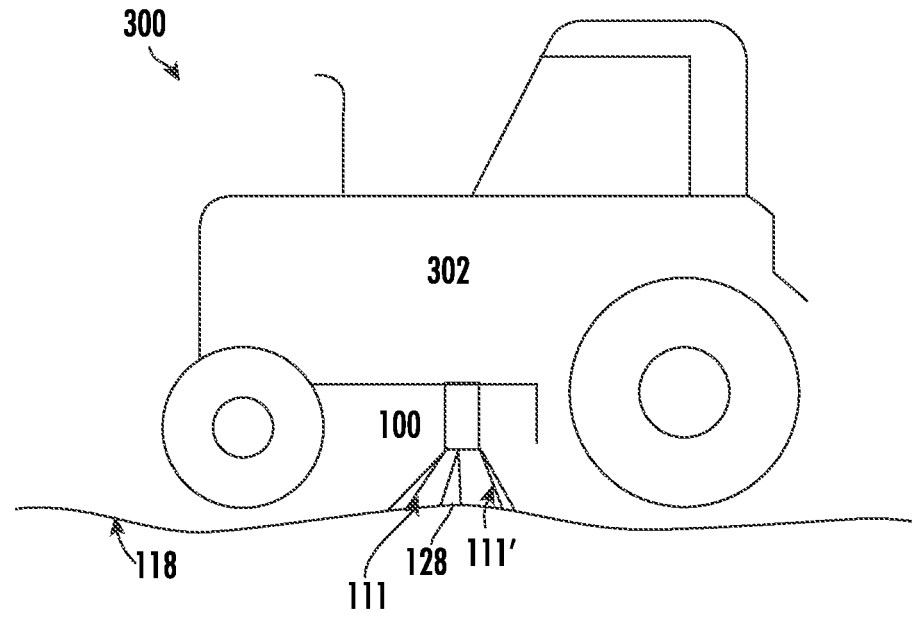
FIG. 3 illustrates an example ground speed sensor environment comprising a multi-beam ground speed sensor attached to a vehicle in accordance with an example embodiment of the present invention.

FIG. 3 illustrates an exemplary ground speed sensor environment 300 comprising a multi-beam ground speed sensor 100 attached to the bottom side of a vehicle 302. The multi-beam ground speed sensor 100 is generating a forward-facing directed frequency spectrum data beam 111 directed toward an obstructing surface 118 at an angle in the direction of motion 128 of the vehicle 302. Also depicted is a rear-facing directed frequency spectrum data beam 111' generated by the multi-beam ground speed sensor 100 and directed toward an obstructing surface 118 at an angle opposite the direction of motion 128 of the vehicle 302. Further, a surface directed frequency spectrum data beam is directed at an angle along the shortest line from the radar IC 104 to the obstructing surface 118.

A multi-beam ground speed sensor 100 as discussed herein may be configured for operation within a variety of environments that involve a moving surface relative to the position of the multi-beam ground speed sensor 100. For example, the multi-beam ground speed sensor 100 could be attached to a car, trailer, wagon, truck, semi-truck, combine, or any other vehicle capable of motion moving along a road, through a field, on the sand, or any other surface capable of reflecting RF electro-magnetic signals. In addition, the multi-beam ground speed sensor 100 may be pointed at the ground, a nearby wall or ceiling, or any other stationary surface in line of sight to the multi-beam ground speed sensor 100. In some embodiments, the multi-beam ground speed sensor 100 may be stationary and used to detect the speed of a moving surface.

FIG. 4 depicts example signal processing circuitry 126, as further described herein. The signal processing circuitry 126 includes a processor 402, input/output circuitry 404, a data storage media 406, and communications circuitry 408. In some embodiments, the signal processing circuitry 126 is configured, using one or more of the sets of circuitry 402, 404, 406, and/or 408, to execute the operations described herein.

Although components are described with respect to functional limitations, it should be understood that the particular implementations necessarily include the user of particular computing hardware. It should also be understood that in some embodiments certain of the components described herein include similar or common hardware. For example, two sets of circuitry may both leverage use of the same processor(s), network interface(s), storage medium(s), and/or the like, to perform their associated functions, such that duplicate hardware is not required for each set of circuitry. The user of the term "circuitry" as used herein with respect to components of the apparatuses described herein should therefore be understood to include particular hardware configured to perform the functions associated with the particular circuitry as described herein.

Particularly, the term "circuitry" should be understood broadly to include hardware and, in some embodiments, software for configuring the hardware. For example, in some embodiments, "circuitry" includes processing circuitry, storage media, network interfaces, input/output devices, and/or the like. Alternatively or additionally, in some embodiments, other elements of the signal processing circuitry 126 provide or supplement the functionality of other particular sets of circuitry. For example, the processor 402 in some embodiments provides processing functionality to any of the sets of circuitry, the data storage media 406 provides storage functionality to any of the sets of circuitry, the communications circuitry 408 provides network interface functionality to any of the sets of circuitry, and/or the like.

In some embodiments, the processor 402 (and/or co-processor or any other processing circuitry assisting or otherwise associated with the processor) is/are in communication with the memory data storage media 406 via a bus for passing information among components of the signal processing circuitry 126. In some embodiments, for example, the data storage media 406 is non-transitory and may include, for example, one or more volatile and/or non-volatile memories. In other words, for example, the data storage media 406 in some embodiments includes or embodies an electronic storage device (e.g., a computer readable storage medium). In some embodiments, the data storage media 406 is configured to store information, data, content, applications, instructions, or the like, for enabling the signal processing circuitry 126 to carry out various functions in accordance with example embodiments of the present disclosure.

The processor 402 may be embodied in a number of different ways. For example, in some example embodiments, the processor 402 includes one or more processing devices configured to perform independently. Additionally or alternatively, in some embodiments, the processor 402 includes one or more processor(s) configured in tandem via a bus to enable independent execution of instructions, pipelining, and/or multithreading. The use of the terms "processor" and "processing circuitry" should be understood to include a single core processor, a multi-core processor, multiple processors internal to the signal processing circuitry 126, and/or one or more remote or "cloud" processor(s) external to the signal processing circuitry 126.

In an example embodiment, the processor 402 is configured to execute instructions stored in the data storage media 406 or otherwise accessible to the processor. Alternatively or additionally, the processor 402 in some embodiments is configured to execute hard-coded functionality. As such, whether configured by hardware or software methods, or by a combination thereof, the processor 402 represents an entity (e.g., physically embodied in circuitry) capable of performing operations according to an embodiment of the present disclosure while configured accordingly. Alternatively or additionally, as another example in some example embodiments, when the processor 402 is embodied as an executor of software instructions, the instructions specifically configure the processor 402 to perform the algorithms embodied in the specific operations described herein when such instructions are executed.

As one particular example embodiment, the processor 402 is configured to perform various operations associated with initiation transmission of directed frequency spectrum data beams (111, 111', 202, 202'), receiving feedback frequency spectrum data 112, and determining a ground speed, for example as described herein.

In some embodiments, the signal processing circuitry 126 includes input/output circuitry 404 that provides output to the user and, in some embodiments, to receive an indication of a user input. In some embodiments, the input/output circuitry 404 is in communication with the processor 402 to provide such functionality. The input/output circuitry 404 may comprise one or more user interface(s) and in some embodiments includes a display that comprises the interface(s) rendered as a web user interface, an application user interface, a user device, a backend system, or the like. The processor 402 and/or input/output circuitry 404 comprising the processor may be configured to control one or more functions of one or more user interface elements through computer program instructions (e.g., software and/or firmware) stored on a memory accessible to the processor (e.g., data storage media 406, and/or the like). In some embodiments, the input/output circuitry 404 includes or utilizes a user-facing application to provide input/output functionality to a client device and/or other display associated with a user.

The communications circuitry 408 includes any means such as a device or circuitry embodied in either hardware or a combination of hardware and software that is configured to receive and/or transmit data from/to a network and/or any other device, circuitry, or module in communication with the signal processing circuitry 126. In this regard, the communications circuitry 408 includes, for example in some embodiments, a network interface for enabling communications with a wired or wireless communications network.

Additionally or alternatively in some embodiments, the communications circuitry 408 includes one or more network interface card(s), antenna(s), bus(es), switch(es), router(s), modem(s), and supporting hardware, firmware, and/or software, or any other device suitable for enabling communications via one or more communications network(s). Additionally or alternatively, the communications circuitry 408 includes circuitry for interacting with the antenna(s) and/or other hardware or software to cause transmission of signals via the antenna(s) or to handle receipt of signals received via the antenna(s). In some embodiments, the communications circuitry 408 enables transmission to and/or receipt of data from a client device in communication with the signal processing circuitry 126.

Additionally or alternatively, in some embodiments, one or more of the sets of circuitry 402-408 are combinable. Alternatively or additionally, in some embodiments, one or more of the sets of circuitry perform some or all of the functionality described associated with another component. For example, in some embodiments, one or more sets of circuitry 402-408 are combined into a single module embodied in hardware, software, firmware, and/or a combination thereof.

FIG. 5 illustrates a flowchart depicting operations of an example process for determining ground speed in accordance with at least some example embodiments of the present disclosure. Specifically, FIG. 5 depicts an example process 500, for example for initiating transmission of a wide beam frequency spectrum data beam 110, receiving feedback frequency spectrum data 112, and determining a ground speed. The process 500 is performable by any number of computing device(s) as described herein, for example embodiment in hardware, software, firmware, and/or any combination thereof. In some embodiments, the signal processing circuitry 126 includes the various circuitry as means for performing each operation of the process 500.

At block 504, the signal processing circuitry 126 may cause the radar transmitters 114 to transmit a frequency spectrum data beam 110 in a wide beam width angle toward an obstructing surface 118. In some embodiments, the wide transmission beam may be obtained by a single transmitter, configured to transmit in a wide angle beam. In other embodiments, the wide transmission beam may be obtained by a plurality of transmitters, positioned in an array to generate a frequency spectrum data beam 110 at a large beam width angle 124. In some embodiments, the beam width angle 124 may be between 90 and 150 degrees, preferably between 105 and 135, and even more preferably between 115 and 125 degrees. In some embodiments, this wide transmission beam will be transmitted along the transmission axis 120 at an angle parallel with the normal of the obstructing surface 118. In other embodiments, the transmission axis 120 may be skewed at a clockwise angle forward in relation to the normal of the obstructing surface 118. In still other embodiments, the transmission axis 120 may be skewed at a counter-clockwise angle backward in relation to the normal of the obstructing surface 118. In some embodiments, the multi-beam ground speed sensor 100 may be positioned to transmit the frequency spectrum data beam 110 along the transmission axis 120 at an angle in relation to the normal of the obstructing surface between +30 (clockwise) and −30 degrees (counter-clockwise), more preferably between +15 and −15 degrees and even more preferably between +5 and −5 degrees.

At block 506, the signal processing circuitry 126 may receive feedback frequency spectrum data from the surrounding environment from the radar receivers 116. These feedback frequency measurements may have resulted from reflections of the forward-facing directed frequency spectrum data beam 111 and reflections from the rear-facing directed frequency spectrum data beam 111' created by the RF absorbent coating, from reflections from unabsorbed RF signals passing through the RF absorbent coating 108, or even from other RF sources.

At block 508, the signal processing circuitry 126 may process the received RF feedback signals and identify the feedback frequency spectrum data 112 received from the forward-facing directed frequency spectrum data beam 111 and rear-facing directed frequency spectrum data beam 111' based on the peak value, signal-to-noise ratio, and the spatial origin of the received feedback frequency spectrum data 112. The process of making these identifications is discussed in more detail in FIG. 7. Based on these identifications, the signal processing circuitry 126 may ignore feedback frequency spectrum data 112 emanating from other sources.

At block 510, the signal processing circuitry 126 may distinguish between feedback frequency spectrum data 112 originating from the forward-facing directed frequency spectrum data beam 111 and feedback frequency spectrum data 112 originating from the rear-facing directed frequency spectrum data beam 111' based at least in part on the spatial origin of the feedback frequency spectrum data 112 (see also FIG. 7).

At block 512, the signal processing circuitry 126 may determine a first ground speed based on feedback frequency spectrum data 112 originating from the forward-facing directed frequency spectrum data beam 111 and determine a second ground speed based on feedback frequency spectrum data 112 originating from the rear-facing directed frequency spectrum data beam 111' (further details in FIG. 7).

At block 514, the signal processing circuitry 126 may identify the feedback frequency spectrum data 112 received from the surface directed frequency spectrum data beam 118 based on the peak value, the signal-to-noise ratio, and/or the spatial origin of the received feedback frequency spectrum data.

At block 514, the signal processing circuitry 126 may determine a height of the multi-beam ground speed sensor 100 based on the flight time of the feedback frequency spectrum data 112 received from the surface directed frequency spectrum data beam 128. Further details on the calculation of the height are found in FIG. 7.

At block 518, the signal processing circuitry 126 may determine a final ground speed by analyzing the first ground speed, the second ground, and the distance of the multi-beam ground speed sensor 100 from the obstructing surface 118. The final ground speed may be determined by averaging the two ground speeds, by calculating a weighted average, by rejecting one ground speed and accepting another, or by similar methods based on the two calculated ground speeds. The distance of the multi-beam ground speed sensor 100 from the obstructing surface 118 may be used to further improve the accuracy of the calculated ground speeds.

FIG. 6 illustrates a flowchart depicting operations of an example process for determining ground speed in accordance with at least some example embodiments of the present disclosure. Specifically, FIG. 6 depicts an example process 600, for example for initiating transmission of a plurality of beamformed frequency spectrum data beams (202, 202'), receiving feedback frequency spectrum data 112, and determining a ground speed. The process 600 is performable by any number of computing device(s) as described herein, for example embodiment in hardware, software, firmware, and/or any combination thereof. In some embodiments, the signal processing circuitry 126 includes the various circuitry as means for performing each operation of the process 600.

At block 602, the signal processing circuitry 126 may cause a plurality of radar transmitters 114 to generate a beamformed frequency spectrum data beam 202 directed at a first angle toward an obstructing surface 118. By manipulating the output timing of the array of radar transmitters 114, the output RF electro-magnetic signals of each of the radar transmitters 114 converge in a particular direction, creating a beamformed frequency spectrum data beam 202. The signal processing circuitry 126 may control the directional angle of the beamformed frequency spectrum data beam 202 anywhere within the beam width of the transmitted RF electro-magnetic signal.

At block 604, the signal processing circuitry 126 may cause a second beamformed frequency spectrum data beam 202' to be transmitted at a second angle, disparate from the first angle, toward the obstructing surface 118. In some embodiments, it is preferred to direct one beamformed frequency spectrum data beam 202 in the direction of vehicle motion, and a second beamformed frequency spectrum data beam 202' in a direction opposite the direction of motion. In some embodiments, the beamformed frequency spectrum data beam 202 is moved from the first angle to the second angle over a short period of time. In some embodiments this short period of time may be between 40 and 500 milliseconds, more preferably between 100 and 200 milliseconds, even more preferably between 110 and 130 milliseconds.

At block 606, the signal processing circuitry 126 may cause a surface directed frequency spectrum data beam 128 to be transmitted at a third angle along the line of shortest distance from the multi-beam ground speed sensor 100' to the obstructing surface.

At block 608, the signal processing circuitry 126 may receive feedback frequency spectrum data 112 from the surrounding environment from the radar receivers 116. These feedback frequency measurements may have resulted from reflections of the first beamformed frequency spectrum data beam 202 and reflections from the second beamformed frequency spectrum data beam 202', from reflections from other nearby surfaces, or even from other RF sources.

At block 610, the signal processing circuitry 126 may process the received feedback frequency spectrum data 112 and identify the feedback frequency spectrum data 112 received from the first beamformed frequency spectrum data beam 202 and the second beamformed frequency spectrum data beam 202' based on the peak value, the signal-to-noise ratio, and the spatial origin of the feedback frequency spectrum data 112. The process of making these identifications is discussed in more detail in FIG. 7. Based on these identifications, the signal processing circuitry 126 may ignore feedback frequency spectrum data 112 emanating from other surfaces and sources.

At block 612, the signal processing circuitry 126 may distinguish between feedback frequency spectrum data 112 originating from the first beamformed frequency spectrum data beam 202 and feedback frequency spectrum data 112 originating from the second beamformed frequency spectrum data beam 202' based at least in part on the spatial origin of the feedback frequency spectrum data 112 (details in description of FIG. 7).

At block 614, the signal processing circuitry 126 may determine a first ground speed based on the feedback frequency spectrum data 112 originating from the first beamformed frequency spectrum data beam 202 and determine a second ground speed based on feedback frequency spectrum data 112 originating from the second beamformed frequency spectrum data beam 202'.

At block 616, the signal processing circuitry 126 may determine a height of the multi-beam ground speed sensor 101' based on the flight time of the feedback frequency spectrum data 112 received from the surface directed frequency spectrum data beam 128.

At block 618, the signal processing circuitry 126 may determine a final ground speed by analyzing the first ground speed and the second ground speed. The final ground speed may be determined by averaging the two ground speeds, by rejecting one ground speed and accepting another, or by a similar method based on the two calculated ground speeds.

In some embodiments, the process 600 may further determine first angle and second angle adjustments based on acceleration data received from an accelerometer 204. As shown in FIG. 6 at block 620, an accelerometer 204 may be utilized to determine the position of the vehicle 302 relative to the obstructing surface 118. An accelerometer 204 may produce readings that allow the signal processing circuitry 126 to determine the yaw, pitch, and roll of the vehicle 302. Each of these components may affect the accuracy of the velocity. The signal processing circuitry 126 may use these determinations to adjust the transmission angle of the beamformed frequency spectrum data beam 202 and/or adjust the calculated speed.

FIG. 7 illustrates a flowchart depicting operations of an example process for determining ground speed in accordance with at least some example embodiments of the present disclosure. Specifically, FIG. 7 depicts an example process 700, for example for determining a ground speed based on received feedback frequency spectrum data 112. The process 700 is performable by any number of computing device(s) as described herein, for example embodiment in hardware, software, firmware, and/or any combination thereof. In some embodiments, the signal processing circuitry 126 includes the various circuitry as means for performing each operation of the process 700.

At block 702, the signal processing circuitry 126 may receive feedback frequency spectrum data 112. The feedback frequency spectrum data 112 received by the signal processing circuitry 126 may have emanated from a number of different sources. The feedback frequency spectrum data 112 may be reflections off surrounding surfaces that are not a part of the obstructing surface 118. For example, reflections off parts of the vehicle 302, anomalies in the obstructing surface 118, reflections from the parts of the multi-beam ground speed sensor 100 itself, or any other surrounding objects. In addition, the feedback frequency spectrum data 112 may be received from other source RF emitters.

At block 704, the signal processing circuitry 126 may determine the peak value of the received feedback frequency spectrum data 112. The feedback frequency spectrum data 112 received by the radar receivers 116 may have been partially absorbed, or traveled long distances, or emanated from an off-beam RF electro-magnetic signal. Further, some received feedback frequency spectrum data 112 may have originated from other RF sources. The radar receivers 116 register the peak value of the received RF signal and relay that magnitude in converted digital form to the signal processing circuitry 126. The signal processing circuitry 126 must determine the peak value for each wave of received feedback frequency spectrum data 112.

At block 706, the signal processing circuitry 126 may apply a peak value threshold and ignore all received feedback frequency spectrum data 112 falling below the peak value threshold. The peak value threshold may be pre-determined based on the multi-beam ground speed sensor 100 system components, based on terrain, or through user input. Further, the peak value threshold may be determined dynamically based on received data. Directed frequency spectrum data beams, such as, 111, 111', 202, and 202' are generated to have a higher peak value then the surrounding output of RF electro-magnetic data. By filtering received RF electro-magnetic data based on peak value, many of the RF signals emanating from off-beam sources will be eliminated.

At block 708, the signal processing circuitry 126 may determine the signal-to-noise ratio (SNR) of the received feedback frequency spectrum data 112 with sufficient peak value. Similar to the peak value threshold, noise may have been introduced into the feedback frequency spectrum data 112 received by the radar receivers 116 if the emitted RF data was partially absorbed, or traveled long distances, or emanated from an off-beam RF electro-magnetic signal. Further, some received feedback frequency spectrum data 112 may have originated from other RF sources. The signal processing circuitry 126 may calculate the SNR of the received feedback frequency spectrum data 112 and relay that SNR, in converted digital form, to the signal processing circuitry 126. The signal processing circuitry 126 must determine the SNR for each wave of received feedback frequency spectrum data 112.

At block 710, the signal processing circuitry 126 may apply an SNR threshold and ignore all received feedback frequency spectrum data 112 falling below the SNR threshold. The SNR threshold may be pre-determined based on the multi-beam ground speed sensor 100 system components, based on terrain, or through user input. Further, the SNR threshold may be determined dynamically based on received data. Directed frequency spectrum data beams, such as, 111, 111', 202, and 202' may have higher SNR values based on the peak value of the transmitted signal and/or the unobstructed path of the transmitted frequency spectrum data beam 110. By filtering received RF electro-magnetic data based on SNR, many of the RF signals emanating from off-beam sources will be eliminated.

At block 712, the signal processing circuitry 126 may determine the spatial origin of the feedback frequency spectrum data 112 with sufficient SNR. A third way the signal processing circuitry 126 may confirm feedback frequency spectrum data 112 is resultant from directed frequency spectrum data beams (111, 111', 202, 202'), is to determine the spatial origin of the received RF electro-magnetic signals. Utilizing a plurality of radar receivers 116 positioned in an array, the signal processing circuitry 126 can determine the spatial coordinates of the received feedback frequency spectrum data 112 by determining the difference in time (or the phase offset) when each signal arrived at an individual radar receiver 116. The time/phase differences can be used to triangulate the source of the feedback frequency spectrum data 112.

At block 714, the signal processing circuitry 126 may identify feedback frequency spectrum data 112 originating from locations within the transmission area of the frequency spectrum data beams (111, 111', 202, 202'). Spatial identification of the origin and filtering will allow the signal processing circuitry 126 to ignore received RF data not resultant from the directed frequency spectrum data beam (111, 111', 202, 202'). Since the signal processing circuitry 126, determines the output angle of the directed frequency spectrum data beam (111, 111', 202, 202'), the signal processing circuitry 126 can determine if the feedback frequency spectrum data 121 emanating from one of those angles. Feedback frequency spectrum data emanating from an angle at which a directed frequency spectrum data beam (111, 111', 202, 202') was transmitted, and received with a sufficient magnitude, will be used in the calculation of the ground speed, while all other feedback frequency spectrum data 112 will be ignored. In some embodiments, this will eliminate RF signals received from surfaces not within the focused spectrum beam of interest.

In addition, in some embodiments, the ability to eliminate RF signals from surfaces not within the focused spectrum beam of interest may enable a multi-beam ground speed sensor 100 as depicted in FIG. 1 to operate without the RF absorbent coating 108. Instead, using spatial origin identification and removal, a multi-beam ground speed sensor 100 may transmit a wide frequency spectrum data beam 110 across the entire span of the beam width angle 124 and receive reflected data across the entire field of transmission. Then, using spatial identification of origin, the signal processing circuitry 126 may determine the spatial origin of all received RF signals. The multi-beam ground speed sensor 100 may then filter and ignore all reflected RF signals originating from the area proximate the axis of transmission, and only use the data proximate the extreme edges of the beam width to determine the speed. Thus, effectively creating a multi-beam ground speed sensor 100.

At block 716, the signal processing circuitry 126 may use spatial origin data and/or frequency shift data to distinguish between forward-facing frequency spectrum data beams 111, rear-facing frequency spectrum data beams 111' (or 202 and 202'), and surface directed frequency spectrum data beams 128. The signal processing circuitry 126 may utilize the spatial origin data and the known directed frequency spectrum data beam (111, 111', 202, 202') direction to determine if the origin of the received feedback frequency spectrum data 112 aligns with a known directed frequency spectrum data beam (111, 111', 202, 202', 128). Feedback frequency spectrum data 112 originating from a location within the directed frequency spectrum data beam (111, 111', 202, 202', 128) may be used to determine the speed of the vehicle 302, while feedback frequency spectrum data 112 originating from a location without the directed frequency spectrum data beam (111, 111', 202, 202', 128) will be ignored when determining the vehicle 302 speed. In addition, frequency shift data may be used to distinguish between forward-facing directed frequency spectrum data beam 111 and rear-facing directed frequency spectrum data beam 111' (or 202 and 202'). For example, feedback frequency spectrum data 112 resulting from reflections of a forward-facing directed frequency spectrum data beam 111 will have a higher frequency based on the movement of the vehicle 302 relative to the obstructing surface 118. Alternatively, feedback frequency spectrum data 112 resulting from reflections of a rear-facing directed frequency spectrum data beam 111' will have a lower frequency based on the movement of the vehicle 302 relative to the obstructing surface 118. The signal processing circuitry 126 may use this information to distinguish between feedback frequency spectrum data 112 resulting from forward-facing spectrum data beams (111, 202) and rear-facing spectrum data beams (111', 202').

At block 718, the signal processing circuitry 126 may determine the distance from the multi-beam ground speed sensor 100, 100' to the obstructing surface 118 based on observed feedback frequency spectrum data 112 from the surface directed frequency spectrum data beam 128. Once feedback frequency spectrum data 112 is determined to originate from a surface directed frequency spectrum data beam 128 by the signal processing circuitry 126, the signal processing circuitry 126 may determine the time-in-flight of the returned data. Using the time-in-flight calculated and the known speed of the transmitted wave, the signal processing circuitry 126 may determine the distance from the radar IC 104 to the obstructing surface 118. The determined height of the multi-beam ground speed sensor 100, 100' may be utilized to further adjust the parameters of the multi-beam ground speed sensor 100, 100' and improve the accuracy of the calculated ground speed.

At block 720, the signal processing circuitry 126 may determine the speed of the vehicle 302 based on the observed phase-shift from the forward-facing directed frequency spectrum data beam 111 (or 202). In some embodiments, the signal processing circuitry 126 may cause the radar IC 104 to transmit two or more directed frequency spectrum data beams (111, 111', 202, 202') in directed at the same angle toward the obstructing surface 118. Using the observed phase-shift from the received feedback frequency spectrum data 112 from separate transmissions, as well as the time difference between the transmissions, and the path difference of the transmissions, the signal processing circuitry 126 may calculate the speed of the vehicle 302 based on the doppler effect equation. For the forward-facing frequency spectrum data beam (111 or 202), the doppler effect equation to calculate the speed of the vehicle is:

$$v_{vehicle} = \frac{\lambda \omega}{4 \pi T_C}$$

where $v_{vehicle}$ is the speed of the vehicle; $T_C$ is the time difference between the transmission of the frequency spectrum data beams 111,111'; $\omega$ is the observed phase difference between the received frequency spectrum data beams 112; and $\lambda$ is the path difference between the transmissions.

Similarly, at block 722, the signal processing circuitry 126 may determine the speed of the vehicle 302 based on the observed phase shift from the rear-facing directed frequency spectrum data beam 111' (or 202') transmissions. For the rear-facing frequency spectrum data beam (111' or 202'), the doppler effect equation to calculate the speed of the vehicle is given by the same equation:

$$v_{vehicle} = \frac{\lambda \omega}{4 \pi T_C}$$

where $v_{vehicle}$ is the speed of the vehicle; $T_C$ is the time difference between the transmission of the frequency spectrum data beams 202,202'; $\omega$ is the observed phase difference between the received frequency spectrum data beams 112; and $\lambda$ is the path difference between the transmissions.

At block 724, the signal processing circuitry 126 may determine the final ground speed by analyzing the ground speed determined from the forward-facing directed frequency spectrum data beam 111 and the ground speed determined from the rear-facing directed frequency spectrum data beam 111'. The final ground speed may be determined by averaging the two ground speeds, by rejecting one ground speed and accepting another, or by any similar method based on the two calculated ground speeds.

Many modifications and other embodiments of the inventions set forth herein will come to mind to one skilled in the art to which these inventions pertain having the benefit of teachings presented in the foregoing descriptions and the associated drawings. Although the figures only show certain components of the apparatus and systems described herein, it is understood that various other components may be used in conjunction with the system. Therefore, it is to be understood that the inventions are not to be limited to the specific embodiments disclosed and that modifications and other embodiments are intended to be included within the scope of the appended claims. Moreover, the steps in the method described above may not necessarily occur in the order depicted in the accompanying diagrams, and in some cases one or more of the steps depicted may occur substantially simultaneously, or additional steps may be involved. Although specific terms are employed herein, they are used in a generic and descriptive sense only and not for purposes of limitation.

While various embodiments in accordance with the principles disclosed herein have been shown and described above, modifications thereof may be made by one skilled in the art without departing from the spirit and the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above.

Additionally, the section headings used herein are provided for consistency with the suggestions under 37 C.F.R. 1.77 or to otherwise provide organizational cues. These headings shall not limit or characterize the invention(s) set out in any claims that may issue from this disclosure.

Use of broader terms such as "comprises," "includes," and "having" should be understood to provide support for narrower terms such as "consisting of," "consisting essentially of," and "comprised substantially of" Use of the terms "optionally," "may," "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

What is claimed is:

1. A true ground speed sensor apparatus comprising:
an enclosure, wherein the enclosure defines a transmission axis perpendicular to a direction of motion;
a single radar integrated circuit (IC) configured to generate frequency spectrum data, wherein the single radar integrated circuit is attached to the enclosure on a side adjacent to an obstructing surface;
one or more radar transmitters coupled to the single radar integrated circuit and configured to transmit the frequency spectrum data in a frequency spectrum data beam along the transmission axis and toward the obstructing surface;
a radio frequency absorbent material positioned to substantially block the frequency spectrum data beam proximate to the transmission axis creating two directed frequency spectrum data beams;
one or more radar receivers coupled to the single radar integrated circuit and configured to receive a feedback frequency spectrum data in the frequency spectrum data beam reflected from the obstructing surface; and
signal processing circuitry in communication with the single radar integrated circuit, wherein the signal processing circuitry comprises at least one processor and at least one memory, the at least one memory having computer-coded instructions thereon, the computer-coded instructions configured to, in execution with the at least one processor, configure the signal processing circuitry to:
(1) receive the feedback frequency spectrum data resulting from the two directed frequency spectrum data beams reflecting off the obstructing surface at two disparate angles and
(2) determine a ground speed based at least in part on phase-shift measurements of the feedback frequency spectrum data.

2. The true ground speed sensor apparatus of claim 1, wherein the signal processing circuitry is configured to ignore the feedback frequency spectrum data reflecting off the obstructing surface proximate the transmission axis of the frequency spectrum data beam.

3. The true ground speed sensor apparatus of claim 1, wherein a beam width of the frequency spectrum data beam is increased by utilizing a plurality of radar transmitters positioned to transmit at disparate transmit angles.

4. The true ground speed sensor apparatus of claim 1, wherein a beam width of the frequency spectrum data beam is greater than 90 degrees and less than 150 degrees.

5. The true ground speed sensor apparatus of claim 1, wherein a plurality of transmitters generate a beamformed frequency spectrum data beam capable of being directed toward the obstructing surface at different angles to produce two or more distinct frequency spectrum data beams.

6. The true ground speed sensor apparatus of claim 5, wherein the beamformed frequency spectrum data beam has a beam width less than 30 degrees and greater than or equal to 1 degree.

7. The true ground speed sensor apparatus of claim 1, further comprising an accelerometer communicatively connected to the signal processing circuitry, wherein the signal processing circuitry is configured to compensate for changes in position in the yaw, pitch, or roll directions relative to the direction of motion based at least in part on acceleration data generated by the accelerometer.

8. A computer-implemented method for measuring a true ground speed comprising:
generating a frequency spectrum data, via a single radar integrated circuit, wherein the single radar integrated circuit is attached to an enclosure on a side adjacent to an obstructing surface, wherein the enclosure defines a transmission axis perpendicular to a direction of motion;
transmitting via one or more radar transmitters coupled to the single radar integrated circuit, the frequency spectrum data in a frequency spectrum data beam along the transmission axis and toward the obstructing surface, wherein a radio frequency absorbent material is positioned to substantially block the frequency spectrum data proximate to the transmission axis creating two directed frequency spectrum data beams;
receiving feedback frequency spectrum data from one or more radar receivers, wherein the one or more radar receivers are coupled to the single radar integrated circuit and are configured to receive feedback frequency spectrum data in the frequency spectrum data beam reflected from the obstructing surface;
identifying feedback frequency spectrum data received from the two directed frequency spectrum data beams; and determining a ground speed based at least in part on phase-shift measurements of the feedback frequency spectrum data received from the two directed frequency spectrum data beams.

9. The computer-implemented method of claim 8, wherein the feedback frequency spectrum data received from the two or more-directed frequency spectrum data beams is identified based at least in part on a peak-value, a signal-to-noise ratio, and a spatial origin of the feedback frequency spectrum data.

10. The computer-implemented method of claim 9, wherein a forward-facing directed frequency spectrum data beam and a rear-facing directed frequency spectrum data beam comprise the two directed frequency spectrum data beams.

11. The computer-implemented method of claim 10, further comprising:

distinguishing between the feedback frequency spectrum data received from the forward-facing directed frequency spectrum data beam and the rear-facing directed frequency spectrum data beam;

determining a first ground speed based on the feedback frequency spectrum data of the forward-facing directed frequency spectrum data beam;

determining a second ground speed based on the feedback frequency spectrum data of the rear-facing directed frequency spectrum data beam; and determining the true ground speed based at least in part on the first ground speed and the second ground speed.

12. The computer-implemented method of claim 9, wherein a beam width angle is greater than 90 degrees and less than 180 degrees.

13. The computer-implemented method of claim 8, wherein a plurality of radar transmitters generate a beam-formed frequency spectrum data beam capable of being directed toward the obstructing surface at different angles to produce two or more distinct frequency spectrum data beams.

14. The computer-implemented method of claim 13, wherein the angles of the two or more distinct frequency spectrum data beams are adjusted to compensate for changes in position in the yaw, pitch, or roll directions relative to the direction of motion based at least in part based on acceleration data received from an accelerometer.

15. The computer-implemented method of claim 13, further comprising:

causing a first beamformed frequency spectrum data beam to be transmitted at a first angle;

causing a second beamformed frequency spectrum data beam to be transmitted at a second angle;

distinguishing between first feedback frequency spectrum data received from the frequency spectrum data beam transmitted at the first angle and second feedback frequency spectrum data received from the frequency spectrum data beam transmitted at the second angle;

determining a first ground speed based on the first feedback frequency spectrum data of the frequency spectrum data beam transmitted at the first angle;

determining a second ground speed based on the second feedback frequency spectrum data of the frequency spectrum data beam transmitted at the second angle; and determining the true ground speed based at least in part on the first ground speed and the second ground speed.

16. The computer-implemented method of claim 8, further comprising:

ignoring feedback frequency spectrum data reflecting off the obstructing surface proximate the transmission axis of the frequency spectrum data beam.

17. The computer-implemented method of claim 16, wherein the feedback frequency spectrum data reflecting off the obstructing surface proximate the transmission axis is ignored based at least in part on a magnitude and a spatial origin of the feedback frequency spectrum data.

18. A computer program product comprising at least one non-transitory computer-readable storage medium having computer-executable program code instructions comprising program instructions to:

generate a frequency spectrum data via a single radar integrated circuit, wherein the single radar integrated circuit is attached to an enclosure on a side adjacent to an obstructing surface, wherein the enclosure defines a transmission axis perpendicular to a direction of motion;

transmit via one or more radar transmitters coupled to the single radar integrated circuit, the frequency spectrum data in a frequency spectrum data beam along the transmission axis and toward the obstructing surface, wherein a radio frequency absorbent material is positioned to substantially block the frequency spectrum data beam proximate to the transmission axis creating two directed frequency spectrum data beams;

receive feedback frequency spectrum data from one or more radar receivers, wherein the one or more radar receivers are coupled to the single radar integrated circuit and are configured to receive the feedback frequency spectrum data in the frequency spectrum data beam reflected from the obstructing surface;

identify the feedback frequency spectrum data received from two directed frequency data beams; and determine a true ground speed based at least in part on the feedback frequency spectrum data received from the two directed frequency spectrum data beams.

* * * * *